(12) United States Patent
Khan

(10) Patent No.: US 11,384,022 B2
(45) Date of Patent: Jul. 12, 2022

(54) METHOD OF PRODUCING LIGHTWEIGHT CERAMIC SAND PARTICULATES FROM COAL POND ASH AND USE THEREOF

(71) Applicant: Abbas Khan, Berlin (DE)

(72) Inventor: Abbas Khan, Berlin (DE)

( * ) Notice: Subject to any disclaimer, the term of this patent is extended or adjusted under 35 U.S.C. 154(b) by 0 days.

(21) Appl. No.: 16/878,860

(22) Filed: May 20, 2020

(65) Prior Publication Data

US 2020/0369571 A1 Nov. 26, 2020

Related U.S. Application Data

(60) Provisional application No. 62/851,156, filed on May 22, 2019.

(51) Int. Cl.
| | |
|---|---|
| *C04B 18/02* | (2006.01) |
| *C04B 18/06* | (2006.01) |
| *C04B 35/10* | (2006.01) |
| *C04B 35/14* | (2006.01) |
| *C04B 41/00* | (2006.01) |

(52) U.S. Cl.
CPC .............. *C04B 35/14* (2013.01); *C04B 35/10* (2013.01); *C04B 41/0072* (2013.01); *C04B 2235/327* (2013.01); *C04B 2235/349* (2013.01)

(58) Field of Classification Search
CPC ..... C03B 35/10; C03B 35/14; C04B 41/0072; C04B 18/023; C04B 18/08; C04B 18/081; C04B 18/085
See application file for complete search history.

(56) References Cited

U.S. PATENT DOCUMENTS

2009/0325781 A1* 12/2009 Jeong .................... C04B 33/025
501/141

* cited by examiner

*Primary Examiner* — Karl E Group

(57) ABSTRACT

The present invention relates to fabricating lightweight ceramic sand as a building and construction material. More specifically it relates to a novel process of manufacturing sintered synthetic lightweight ceramic sand particulates directly from pond ash and fly ash as a secondary raw material. The said synthetic lightweight ceramic sand can be used as a building material. The novel feature of the invention is to manufacture low cost lightweight sand at high throughput to compete against the fast depleting natural sand and crushed stones.

10 Claims, No Drawings

METHOD OF PRODUCING LIGHTWEIGHT CERAMIC SAND PARTICULATES FROM COAL POND ASH AND USE THEREOF

CROSS REFERENCE TO THE RELATED PATENTS

This application claims the benefit of priority to U.S. Provisional Patent Application Ser. No. 62/851,156, filed May 22, 2019 the entirety of which is incorporated herein by reference.

TECHNICAL FIELD OF INVENTION

The present invention relates to fabricating lightweight ceramic sand particulates. The present invention particularly relates to a novel process of manufacturing sintered synthetic lightweight ceramic sand particulates directly from coal pond ash as a primary raw material. The said synthetic lightweight ceramic sand can be used as a building material. The novel feature of the invention is to manufacture low cost lightweight sand at high throughput to compete against the fast depleting natural resources such as natural sand and crushed stones.

BACKGROUND OF THE INVENTION

Coal combustion products (fly ash and bottom ash) are a waste by-product obtained by burning coal in coal fired power stations. Currently, about 1,400 annual million tonnes of coal combustion products (CCPs) is produced worldwide. On average about 55% of the CCPs produced is utilized, while most of the remaining 45% is dumped into ash ponds (lagoons) though a wet disposal system.

In wet disposal system CCPs is mixed with water typically in 1:10 ratio and transported through pipeline for discharging into the artificially created ash pond/dyke in slurry form. This slurry disposal requires large area of land for creating ash pond and huge quantity of water which are getting scarce. Additionally, this wet disposal process reduces the pozzolanic reactivity which is an important property of fly ash to be used in cement manufacture.

The global demand for good quality sand in construction and other industries is applying increasing pressure on the dwindling natural sand sources. Annual production and consumption of sand outstrips nature's ability to generate sand by a factor of two. Particulates like sand are a high-volume consumption building material and an essential component of the construction industry. Currently, 40 billion tonnes of sand consumed worldwide of which 30 billion tonnes are used in the concrete and mortars production. The rapid urbanization puts growing pressure for supply from natural sand deposits in mostly ecologically fragile environments. Natural sand takes millions of years to form and is fast depleting. The extreme high consumption of sand has endangered coastal lines and 30 islands disappearance in the south east Asia.

Reference may be made to JPH09156998A which discloses a ceramic which is obtained by molding and sintering very fine particles of coal ash having 1-10 μm particle diameter. The very fine particles of coal ash are mutually bonded, a great number of fine voids are formed between the bonded very fine particles. These voids have a microstructure leading from the surface of the ceramic particles to the interior, 1-1.9 g/cm$^3$ bulk density and 10-50 vol % percentage of water absorption, high air permeability and water permeability and proper water retention.

Reference may be made to U.S. Pat. No. 8,257,486 B2 which discloses a composition and a process for the preparation of chemical activated cold setting fly ash building construction materials. The chemical activator is an alkaline aqueous solution of 11.2 to 13.6 in pH and 1.25 to 1.40 gm/cc in density which contains admixtures of different concentrations of hydroxyl, sulfate, acetate and chloride bearing chemical salts of calcium, magnesium, sodium, potassium and aluminum in water medium. The reaction of chemical activator solution and the mineral constituents of fly ash or pond ash mix develop binding property. The binding matrix of chemical activated fly ash mix or pond ash is mostly hydrous silica and silicate group of phases which on setting under atmospheric condition attains strength suitable for building construction application. In one embodiment of the present invention, the fly ash, pond ash and mixtures thereof is used in the range of 80 to 99% by weight.

Reference may be made to CN107827435A which discloses a lightweight ceramic large board. The lightweight ceramic large board comprises the following raw materials in percent by weight: 35 to 60 percent of coal ash, 5 to 10 percent of waste glass, 5 to 12 percent of kaolin, 0.1 to 0.5 percent of a foaming agent, 10 to 20 percent of potassium feldspar, 10 to 20 percent of soda feldspar, 5 to 30 percent of ceramic tile polished waste residue, and 0.1 to 0.2 percent of electrolyte; a preparation method of the lightweight ceramic large board comprises the following steps: (1), batching, (2), ball milling, (3), slurrying, (4), ageing, (5), homogenizing, (6), laying treatment, (7), screening, (8), laying treatment, (9), spray drying, (10), ageing, (11), laying treatment, (12), firing, and (13), cooling. The lightweight ceramic large board has the advantages that the surface of the lightweight ceramic large board can be decorated at will with paint, modified resin, wall cloth, wallpaper and mounting nails with various effects and be drilled, the market prospect is wide, and the lightweight ceramic large board further meets state-sponsored solid waste utilization policies and the energy-saving and environment-friendly trend of the world building industry.

Reference may be made to "*Ceramic tiles derived from coal fly ash: Preparation and mechanical characterization*", in Ceramics International 43(15)·June 2017; which discloses effective utilization of coal fly ash (CFA), for example, as a raw material for ceramics production. In this study, clay- and feldspar-like materials fabricated by alkali activation pretreatment of CFA were mixed with untreated CFA (regarded as a quartz-like material) and sintered to prepare fully ash-based ceramic tiles. The obtained tiles exhibited excellent sintering properties, e.g., low firing temperature and a wide sintering range; further, they showed better green strength (due to hydrogen bonding) and post-sintering performance (due to fluxing and mullite skeleton effects) than ceramic tiles produced exclusively from untreated CFA. The fully ash-based ceramic tiles sintered at 1100° C. exhibited optimal post-sintering properties (bulk density, 2.5 g/cm$^3$; rupture modulus, 50.1 MPa; and water absorption, 0%). Thus, the proposed method is well suited for preparing a novel kind of ceramic tiles completely derived from CFA, highlighting its importance in the field of fly ash ceramics.

Reference may made to WO2016202484 which discloses that lightweight fine ceramic particulates, directly obtained from fly ash, their use in different technical fields and building material compositions comprising the same. Disclosed is further the use of lightweight fine ceramic particulates according to the invention as aggregate for construction purposes, especially in combination with fly ash. Lightweight fine ceramic particulates according to the invention are further used as additive in paint or coating formulations, as foundry sand, additive for waste water treatment, substrate for horticultural purposes, for hydroponic gardening, for green roofing purposes or for applications in geotechnics. Disclosed are also building material compositions in form of mortar or concrete, comprising the lightweight fine ceramic particulates according to the invention. The lightweight fine ceramic particulates according to the invention, and especially the building material compositions derived from them, are advantageous in respect to superior quality and workability, sound insulation and sustainability from internal curing.

Reference may be made to 3099/MUM/2011 which discloses to fabricating light weight fine particulates building materials like sintered sand from industrial wastes. More, specifically it relates to a novel process of manufacturing sintered synthetic sand from fly ash. The method is related in producing light weight fine particulates like sintered sand at high throughput and relatively low cost to compete against the fast depleting natural sand. 3099/MUM/2011 being the closest prior art discloses the production of lightweight ceramic materials from fly ash.

However, none of the prior art teaches a process that can be used for pond ash as its characteristics differs significantly from either fly ash, bottom ash or the combination of both in dry form. All processes on simple modifications thereof, including that in 3099/MUM/2011, have been found unusable for pond ash.

None of the above said prior arts mentions about lightweight sand particulates being produced from coal pond ash which is a key feature of the present invention.

There is an urgent need to address the issue from pond ash which is a mixture of fly ash, bottom ash and water. At the same time we are facing tremendous scarcity of natural sand due to heavy demand in ever growing construction activities which has forced research and development to find a suitable substitute.

One of the desirable is pond ash to convert it into ceramic sand as replacements for natural sand, manufactured sand, fine aggregates and lightweight fine aggregates to produce concrete, mortars, plasters, bricks, blocks and tiles.

The present invention overcomes the above problems through one step manufacturing process which involves direct granulation of pond ash and fly ash thus eliminating the need of drying ash pond. Drying coal ash pond is not only complex but also a costlier and energy intensive process.

The reasons favoring this approach are: (1) pond ash constitutes between 50-95 wt % and fly ash between 50-5 wt % of the total synthetic particulates weight (2) the natural resources (like sand and fine aggregates) is fast depleting (3) demand for ecological and green products is continuing to increase and (4) addressing the need of sustainable management of natural resources and circular economy.

Based on the fact that major component in the present invention is waste by-products, i.e., pond ash and fly ash (dry), the raw material are inexpensive making the man made ceramic sand competitive and thus helps alleviate a waste disposal problem. Therefore, successful and economical manufacture of particulates from mixture of pond ash and fly ash will not only reduce the environmental but also provide a great benefit to the economy.

The present invention involves fabricating lightweight ceramic sand from a mixture of industrial wastes. The said fabricating process is a novel process for manufacturing synthetic lightweight ceramic sand. Substitution of natural sand with lightweight ceramic sand produced from two different industrial wastes i.e., coal pond ash and dry fly ash though both derived from the coal fired power plants, supports protection of these habitats where natural sand is sourced.

The lightweight sand produced in the present invention offers the best alternative to natural sand, crushed stones and lightweight fine aggregates.

OBJECT OF THE INVENTION

The main objective of the invention is to provide a novel, simple and economical method of engineered well-defined ceramic lightweight sand from combination of different industrial wastes.

Another objective of the invention is to provide an alternative way of substituting natural sand, manufactured sand (also known as crushed stones), light fine aggregates to produce concrete, plasters, mortars, renders and roof tiles.

Yet another objective of the present invention is to manufacture the said product using mixture of pond ash and fly ash which are an undesirable by-product and/or wastage.

Other objective of the present invention is to manufacture size graded fine particulates at high throughput and at lowest manufacturing cost without the need of drying coal pond ash which cost energy.

Other objective of the present invention is to manufacture lightweight ceramic sand, an alternative to natural sand or crushed stones from natural resources.

SUMMARY OF THE INVENTION

In one aspect, the present invention discloses a novel, simple and economic process for manufacturing lightweight ceramic sand.

In another aspect, the aforementioned product is produced from industrial wastes, wherein the major raw material is pond ash and fly ash.

In yet another aspect, the present invention relates to fabrication of fine particulates at high throughput and at very low manufacturing cost to compete against the fast depleting natural sand including crushed stones and lightweight fine aggregates produced from expanded clay, expanded glass and volcanic activities.

In still another aspect, the present invention provides a novel method of manufacturing lightweight fine particulates comprising the steps of:
1. Pond ash cake formation using filter press
2. Pond ash, fly ash and additives are put into high intensity shear mixer
3. Homogenous mixing of raw materials followed up by granules formation
4. Fine particulates with sand graded size gradation with sub-round shapes are produced
5. Particulates are dried using fluidized bed drying process
6. Particulates of desired size gradation, shapes and strength are sintered at high temperature (975-1300° C.)

DETAILED DESCRIPTION OF THE INVENTION

The present invention may be understood more readily by reference to the following detailed description of the invention taken in connection with the accompanying drawing figures, which forms a part of this disclosure. It is to be understood that this invention is not limited to the specific devices, methods, conditions or parameters described and/or shown herein and that the terminology used herein is for the example only and is not intended to be limiting of the claimed invention. Also, as used in the specification including the appended claims, the singular forms 'a', 'an', and 'the' include the plural, and references to a particular numerical value includes at least that particular value unless the content clearly directs otherwise. Ranges may be expressed herein as from 'about' or 'approximately' another particular value. when such a range is expressed another embodiment. Also, it will be understood that unless otherwise indicated, dimensions and material characteristics stated herein are by way of example rather than limitation, and are for better understanding of sample embodiment of suitable utility, and variations outside of the stated values may also be within the scope of the invention depending upon the particular application.

Embodiments will now be described in detail with reference to the accompanying drawings. To avoid unnecessarily obscuring the present disclosure, well-known features may not be described or substantially the same elements may not be redundantly described, for example. This is for ease of understanding.

The drawings and the following description are provided to enable those skilled in the art to fully understand the present disclosure and are in no way intended to limit the scope of the present disclosure as set forth in the appended claims.

In order to achieve a better understanding of the nature of the present invention a preferred embodiment of a method of fabricating lightweight ceramic sand will now be explained.

In one embodiment, the present invention discloses a novel process of granules formation from pond ash and fly ash. The said process allows mixing of pond ash in the range of 50-95 wt % and fly ash in the range of 50-5 wt %. Granules are formed using highly intensity shear-mixer and dried between 150-300 Deg C. Dried granules are sintered at high temperature in the range of about 975-1300° C. The resultant product conforms size gradation as per harmonized DIN 13139 (sand for mortars) and DIN 12620 (fine aggregates for concrete). Simultaneously, the product also conform DIN 13055 (lightweight aggregates for concrete and mortars).

In another embodiment, the aforementioned method of manufacturing lightweight ceramic sand comprises the steps as follows:
(a) mixture of pond ash and fly ash are transform to granules;
(b) drying said granules to obtain dried granules
(c) high temperature sintering of said dried granules thereby obtaining said lightweight ceramic sand.

In another embodiment, the aforementioned method utilises pond ash is preferably between 50-95 wt % and fly ash between 50-5 wt %. Further, bentonite clay may be added to the fly ash or to the pond ash, before forming granules. In addition, the coal pond ash may range between 50-95 wt %, fly ash 45-5 wt % and bentonite between 5-0%.

In another embodiment, the aforementioned method may further include the addition of fine silica to the fly ash or to the coal pond ash, before forming granules. The aforementioned pond ash may range between 50-95 wt %, fly ash between 40-5 wt % and fine silica between 10-0 wt %.

In another embodiment, the aforementioned method comprises a drying step wherein said drying is fluidized bed drying between 150-300° C.

In another embodiment, the aforementioned method may further involve a step of high temperature sintering wherein the temperature may range between 975-1300° C.

In another embodiment, the aforementioned method involves light weight ceramic wherein the size of said lightweight ceramic sand may range between be not limited to 0.063 mm to 4 mm. Further, the size of said lightweight ceramic sand conforms to size gradation as per harmonized DIN 13139 (sand for plaster). Furthermore, the size of said lightweight ceramic sand conforms to size gradation as per harmonized DIN 12620 (fine aggregates for concrete). In addition, the size of said lightweight ceramic sand conforms to lightweight aggregates definition as per harmonized DIN 13055:2016.

In another embodiment, the bulk density of said lightweight ceramic sand is between but not limited from 750 kg/m$^3$ to 1,180 kg/m$^3$.

EXPERIMENTAL DESCRIPTION

The below experimental details are provided to illustrate the working of the invention, and it should not be construed to limit the scope of the invention in any way.

Pond ash and fly ash samples were received from coal fired power plants. Before granulation process, water content of pond ash was determined which is typically in the range of 25-35 wt %. The resultant cake then transferred into high intensity shear mixture. Fly ash (dry form) and additives are added into the mixture as well.

The ratio of the said combination for pond ash cake 50-95 wt %, for fly ash is 50-5 wt %, for fine silica 10-0 wt % and for bentonite is 5-0 wt %. The mixture improves green body strength. The formulations are prepared as indicated in Table 1, which is provided below:

TABLE 1

| Formulation - 1 | | Formulation - 2 | | Formulation - 3 | |
| --- | --- | --- | --- | --- | --- |
| Chemicals | G | Chemicals | G | Chemicals | g |
| Pond ash cake | 50-95 | Pond ash cake | 50-95 | Pond ash cake | 50-95 |
| Fly ash | 50-5 | Fly ash | 45-5 | Fly ash | 40-5 |
| | | Bentonite | 5-0 | Fine silica | 10-0 |
| Total | 100 | Total | 100 | Total | 100 |
| Additives & Water | | Additives & Water | | Additives & Water | |
| Pentasodium triphosphate | 0-1 | Pentasodium triphosphate | 0-1 | Pentasodium triphosphate | 0-1 |
| Sulphonated salts of melamine formaldehyde | 0-1 | Sulphonated salts of melamine formaldehyde | 0-1 | Sulphonated salts of melamine formaldehyde | 0-1 |
| Water | 0-15 | Water | 0-15 | Water | 0-15 |
| Total Additives & Water | | Total Additives & Water | | Total Additives & Water | |

Pond ash cake disposed into the high intensity shear-mixer. Fly ash, bentonite, additives, and/or fine silica added to the cake both rotor and pan are rotating. The blending and mixing carried out for up to 60 seconds to ensure homogeneous mixing. If the mixture is dried due to high fly ash content, then water is added to the mixture. This addition of water is done under rotating condition of both rotor and pan. The rotation is carried out for 3-6 minutes. During the rotation procedure plurality of granules/spheres is formed. The granules thus obtained are herein referred to as sand precursor.

The moistened sand precursors are then dried using fluidized bed dryer. The residence time of fine particulates in the dryer depends upon several factors such as dryer's length, drying temperature, drying duration and air flow. For the experiment temperature of the dryer used in the range of about 150-300° C. and air feed between 750-1,500 m³/h and drying duration 4-8 minutes.

Dried sand precursors which has moisture between 1-5 wt % are fired in rotary kiln. The residence time of sand precursors in the kiln depends on several factors such as kiln length, temperature of the kiln which is in the range of about 975-1,300° C., chemical composition, particulate size, throughput and temperature of sand precursors. The size of lightweight sand particles produced are typically between 0.063 mm to 4 mm. The bulk density of these lightweight sand particulates are between 750 kg/m³ to 1,180 kg/m³ depending on the source of coal.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but as such are intended to cover the application or implementation thereof without departing from the spirit or scope of the invention.

What is claimed is:

1. A process of manufacturing sintered synthetic lightweight ceramic sand particulates from coal pond ash as a primary raw material comprising the following steps:
   (a) mixing pond ash between 50-95 wt %, fly ash between 40-5 wt %, bentonite between 5-0 wt %, silica between 10-0 wt %, and natural additive between 0-1 wt % to transform to granules;
   (b) drying said granules to obtain dried granules;
   (c) high temperature sintering of said dried granules thereby obtaining said lightweight ceramic sand, characterised in that, bulk density of said lightweight ceramic sand produced is between 750 kg/m³ to 1180 kg/m³, and thermal conductivity of hardened mortar produced from said lightweight ceramic sand is less than 0.70 W/(m*K) using a Hot Disk device that meets ISO standard 22007-2.

2. The process of manufacturing the sintered synthetic light weight ceramic sand particulates as claimed in claim 1 wherein, the pond ash comprises of 50 wt % to 70 wt % of combination of $SiO_2$, $Al_2O_3$ and $Fe_2O_3$.

3. The process of manufacturing the sintered synthetic light weight ceramic sand particulates as claimed in claim 1 wherein, said natural additives is selected from pentasodium triphosphate and sulphonated salts of melamine formaldehyde; between 0-1 wt %.

4. The process of manufacturing the sintered synthetic light weight ceramic sand particulates as claimed in claim 1 wherein, the granules are formed using high intensity shear-mixer and dried between 150-300 Deg C.

5. The process of manufacturing the sintered synthetic light weight ceramic sand particulates as claimed in claim 1 wherein the granules are dried using a dryer in the range of about 150-300° C. and air feed between 750-1,500 m³/h and drying duration 4-8 minutes.

6. The process of manufacturing the sintered synthetic light weight ceramic sand particulates as claimed in claim 1 wherein, the dried granules are sintered at high temperature in the range of about 975-1300° C.

7. The process of manufacturing the sintered synthetic light weight ceramic sand particulates as claimed in claim 1 wherein, the size of lightweight sand particles produced is between 0.063 to 4 mm.

8. The process of manufacturing the sintered synthetic light weight ceramic sand particulates as claimed in claim 1 wherein, pond ash and fly ash samples were received from coal fired power plants.

9. The process of manufacturing the sintered synthetic lightweight ceramic sand particulates as claimed in claim 1 wherein, said lightweight ceramic sand offers an alternative to natural sand, crushed stones from natural resources or lightweight line aggregates to produce concrete, plasters, mortars, renders and roof tiles.

10. The process of manufacturing the sintered synthetic light weight ceramic sand particulates as claimed in claim 1 wherein the coal pond ash is not dried before granulation.

* * * * *